April 20, 1965 R. E. SORENSEN 3,179,928

SEARCH MEMORY USING LONGITUDINAL STEERING FIELDS

Filed Jan. 17, 1961

INVENTOR
ROBERT E. SORENSEN
BY Griffin and Stokes
ATTORNEYS

United States Patent Office 3,179,928
Patented Apr. 20, 1965

3,179,928

SEARCH MEMORY USING LONGITUDINAL STEERING FIELDS

Robert E. Sorensen, Bloomington, Minn., assignor to Sperry Rand Corporation, New York, N.Y., a corporation of Delaware Filed Jan. 17, 1961, Ser. No. 83,311
21 Claims. (Cl. 340—174)

The present invention relates to magnetic core memories for the storage of binary information, and more particularly to a memory which can have all of its word registers searched simultaneously in nondestructive fashion for a particular binary word.

In most of the prior art binary memories for use in data processing apparatus, binary words consisting of either a fixed or variable number of binary bits are stored in "word register locations" of the memory, with each register denoted by a unique memory address. A binary word may be extracted from its addressed register either in parallel or in serial fashion, when referring to the extraction of the bits representing said word. However, in many systems, it is not possible to examine the contents of more than one word register at a time, since only one set of addressing circuits is normally provided. Furthermore, where such a memory consists of a plurality of the typical prior art magnetic cores, each in the form of a toroid or the like, the interrogation of the word register destroys the information contained therein so that a write cycle must be performed following any read cycle in order to reinsert the information if it is desired to retain same in the memory. Thus, the above characteristics of prior art magnetic core memories have seriously reduced their operating time, especially when it is desired to search all the word registers therein to see if any contains a particular binary word.

The present invention provides an improvement over prior art magnetic core binary memories in that all word registers therein may be searched simultaneously in nondestructive fashion. Each binary cell element of a word register holds one binary bit and is comprised of a pair of magnetic cores, each of the type having a preferred axis of magnetization such as is described in the United States patent to Rubens, 2,900,282 (1959). In this kind of a magnetic core, which normally takes the shape of a thin film, the remanent magnetization lies along the preferred axis in either one of two opposite directions. One core of a cell pair thereby has its remanent magnetization set so as to represent a binary "1" or a binary "0." These cells are arranged in a plurality of columns with each column being a register for the storage of a complete binary word. Each cell within a column has a different binary order significance attached thereto. In order to interrogate the contents of a cell, the second core of a cell pair has its direction of magnetization influenced by the remanent magnetization of the first core, unless there is applied an interrogating signal representing a bit of the search word, for cancelling this influence. In this event, a signal is produced due to a change in the magnetization of the second core which indicates the absence in the cell of this particular searched binary bit.

It is therefore an object of the present invention to provide a magnetic memory matrix which can be searched rapidly for the presence or absence of a particular word, which comprises at least one column of a plurality of first magnetic cores each containing a binary bit of a word, and each having associated therewith a second magnetic read-out core for nondestructively interrogating the contents of the associated first memory core.

Another object of the invention is to provide a search memory in which each memory core is provided with a read-out core having a direction of magnetization influenced by the remanent magnetization in the memory core, together with means for generating a magnetic field for causing the magnetization of the read-out core to fall in a predetermined direction along its preferred axis whenever the influence of the first core is cancelled by an interrogating signal.

Another object of the present invention is to provide a search memory capable of rapid operation in which the direction of the magnetization of a read-out core associated with a memory core need only be rotated through a maximum angle of 90 degrees.

These and other objects of the present invention will become apparent during the course of the following description, which is to be read in conjunction with the drawings, in which:

FIGURE 1 is an exploded view of one binary storage cell used in the present search memory.

FIGURES 2*a* and 2*b* show vector diagrams of the magnetic field and flux directions in the read-out core of FIGURE 1;

Figure 1:
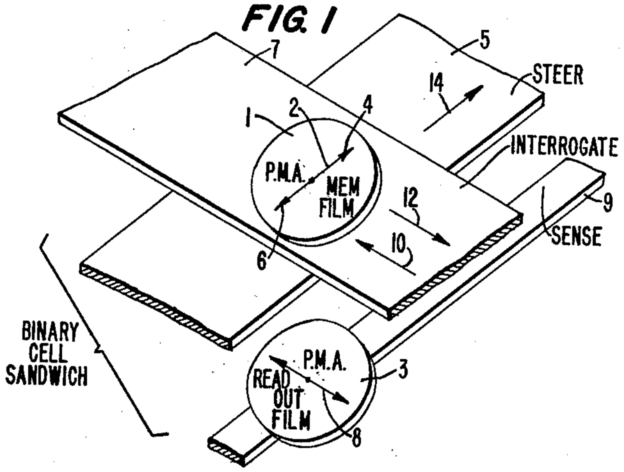

Referring first to FIGURE 1, there is shown an exploded view of a single binary cell used in the search memory of the present invention. Two magnetic cores 1 and 3 are provided, one for storing a binary bit of information and the other for nondestructively interrogating same. Core 1 is shown as comprising a thin film of magnetic material which may be deposited upon a substrate (not shown) in the manner disclosed and claimed in the aforementioned Rubens patent. However, limitation to cores prepared by this method is not intended. Such films are preferably of the uniaxial anisotropic type which have a single preferred axis of magnetization along which lies any remanent magnetization in either of two opposite directions. This preferred magnetic axis is illustrated in core 1 by the double ended arrow 2. This axis is sometimes referred to as the "easy" axis. During application of one or more large external magnetic fields to core 1, the magnetization of the film lies in the direction of said field. Upon termination of the external fields, any remanent magnetization in the film will revert to one of two opposite directions along the preferred magnetic axis instead of in the direction of the last applied field. The particular direction of the remanent magnetization along the easy axis depends upon several conditions, among which is the smallest angle that the magnetization need turn through after termination of the external field in order that the remanent magnetization will lie parallel to the preferred magnetic axis. Thus, by use of means not necessarily shown in FIGURE 1, a "1" bit may be stored in memory film 1 by causing its remanent magnetization to lie along the preferred magnetic axis 2 in a direction indicated by arrowhead 6. In like fashion, a binary "0" may be stored in memory film 1 by causing its remanent magnetization to lie parallel to the preferred magnetic axis 2 in a direction indicated by arrowhead 4.

Inductively associated with memory core 1 is a read-out core 3 having also a preferred axis of magnetization which is indicated by a double ended arrow 8. Core 3, which preferably is also a thin uniaxial anisotropic film, lies in a plane parallel to the plane of core 1, and directly beneath core 1 as indicated in FIGURE 1. However, core 3 is oriented with respect to core 1 such that its preferred magnetization axis 8 is transverse the preferred magnetization axis 2 of core 1. Preferably, the angle made by these two axes is 90 degrees, although the invention is not to be construed as being limited to this particular value. Core 3 is also formed upon a substrate not shown, and is electrically insulated from core 1 by means not shown.

Any remanent magnetization existing in memory film 1 produces a magnetic field external thereto which influences the degree and direction of the magnetization in the read-out core 3. Because this external field has the same direction as does the remanent magnetization in core 1, it is noted that the field must be transverse to the preferred axis of magnetization 8 in core 3. In the present invention, the strength of this magnetic field from core 1 is sufficiently great to create lines of flux in read-out core 3 which substantially lie in the same direction as that of the field. Therefore, it will be appreciated that the magnetization in core 3 due to the biasing field of the core 1 remanent magnetization is in a direction transverse to the direction of its preferred magnetic axis 8. However, although core 3 is inductively coupled to core 1, the field set up by any flux in core 3 should not substantially affect the direction of magnetization in core 1. This may be practically accomplished by providing core 1 with relatively high coercivity while core 3 has relatively low coercivity.

As before noted, the purpose of core 3 is to enable the interogation of the binary content of core 1 without destroying said contents. Inasmuch as the binary content of core 1 is indicated by the direction of its remanent magnetization, the direction of magnetization in core 3 is also indicative of this binary bit because of the effect of the external biasing field. It will be noted that the term "remanent magnetization" may be defined as that magnetization remaining in a magnetic material in the absence of any applied external field. Therefore, if the effect of the external field generated by core 1 is cancelled as regards core 3, then the remanent magnetization remaining in core 3 will lie parallel to the preferred magnetic axis 8 therein in either one of two opposite directions. Any change of directions of magnetization in core 3 can be sensed in order to determine the nature of the binary content of core 1. The manner in which the above is accomplished is described below.

Associated with the binary cell in FIGURE 1 is a drive line 5 which is electrically insulated from the cores 1 and 3 but which is inductively coupled at least to core 3. Any current flowing through conductor 5 sets up an external magnetic field having a direction at a right angle thereto. If conductor 5 is oriented so that it lies at a right angle to the preferred magnetic axis 8 in core 3, then any external field generated by current flowing therethrough will be approximately parallel with this axis. This field, which may be called a longitudinal steering field, need have a magnitude sufficient only to cause the remanent magnetization in core 3 to always revert to the same direction upon cancellation of any external field in core 3 which is transverse to the preferred magnetic axis 8. Thus, the longitudinal steering field, as generated by current flowing in conductor 5, determines a definite and unchangeable direction to which the remanent magnetization in core 3 returns in the absence of any strong net trasverse external field applied thereto.

Cancellation of the effect of the external biasing field (applied by the remanent magnetization in core 1) is accomplished by means of a drive conductor 7 which may have current flow in either one of two opposite directions, and which is inductively coupled to at least core 3. Any external field generated by current in conductor 7 will be at right angles to its axis. If conductor 7 is oriented transverse to the preferred magnetic axis 2 of core 1, then it will be seen that the external field generated by conductor 7 either reinforces or reduces the effect in core 3 of the external biasing field produced by the core 1 remanent magnetization. Conductor 7 is electrically insulated from the two cores 1 and 3 and from the other drive conductors.

In order to sense a change in the direction of magnetization in core 3, a sense line 9 is provided inductively coupled therewith and so orientated that any change of magnetization in the direction of the preferred magnetic axis 8 results in a voltage being induced therein. Obviously, any change in magnetization of core 3 in a direction parallel to the axis of conductor 9 will not generate an output signal therein, since flux in this direction does not link the conductor.

In order to fully understand the operation of FIGURE 1, FIGURES 2*a*, 2*b*, and 3 will now be examined. In each of the FIGURES 2*a* and 2*b*, there are shown two vector diagrams, the upper one indicating the approximate magnitude and direction of the magnetic fields involved in the present operation, and the lower one indicating the approximate magnitude and direction of the magnetization in core 3. For the purpose of this description, it is assumed that the elements in FIGURE 1 are geometrically oriented as follows, which is the preferred, but not the only, embodiment of the invention. The preferred magnetic axis 8 of core 3 is oriented at approximately a 90 degree angle with the preferred magnetic axis 2 of core 1. The axes of conductors 5 and 9 are both substantially parallel with the preferred magnetic axis 2 of core 1, while the axis of conductor 7 is substantially parallel with the preferred magnetic axis 8 of core 3. Although the operation of the invention is to be described using this preferred geometrical configuration, it is to be understood that the invention is not to be limited thereto.

Figure 2A:
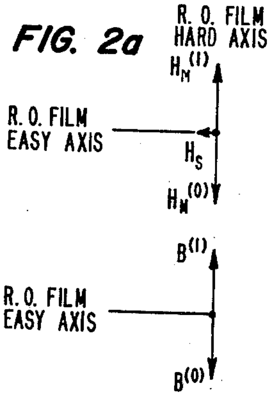

In FIGURE 2*a*, the external field produced by core 1 remanent magnetization representing binary "1" is indicated by the vector labeled $H_M(1)$ in the upper diagram, while the external field representing binary "0" is indicated by the vector labeled $H_M(0)$. Obviously, only one of these two vectors may exist in the cell at any one time. The core 1 and 3 parameters are so chosen that the biasing field $H_M(1)$ and $H_M(0)$ are about 1.5 times the $H_M$ of core 3. A small steering current is caused to flow through the conductor 5 in a direction 14 so that an external field labeled $H_S$ is generated which lies at a 90 degree angle with respect to the external biasing fields $H_M(1)$ or $H_M(0)$. Since conductor 5 lies at a right angle with the preferred magnetic axis 8 of core 3, field $H_S$ must also lie parallel to the preferred magnetic axis 8 of the read-out core 3. The magnitude of field $H_S$ may be quite small inasmuch as its only function is to insure that the remanent magnetization in core 3 will fall in the direction of $H_S$ along axis 8 when the effect of transverse external fields $H_M(1)$ or $H_M(0)$ is cancelled.

Now turning to the lower vector diagram of FIGURE 2*a*, it is seen that the direction of flux B in core 3 is primarily determined by the direction of the applied external fields $H_M(1)$ or $H_M(0)$. For example, when field $H_M(1)$ is generated, then magnetization B(1) in a direction parallel to said field is produced in core 3. If field $H_S$ is also present in core 3 at this time, then B(1) would actually be in a direction determined by the resultant of the two fields, $H_M(1)$ and $H_S$. However, inasmuch as the magnitude of the field $H_M(1)$ is relatively large with respect to the magnitude of field $H_S$, it may be considered that the flux direction B(1) is substantially parallel to that of the former.

Figure 2B:
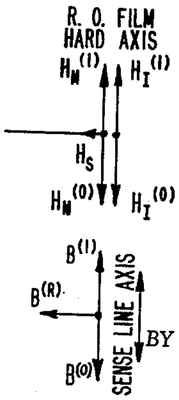

In like fashion, the presence of field $H_M(0)$ causes the creation of flux in core 3 having a direction substantially as indicated by the vector labeled B(0) in FIGURE 2*b*. It will therefore be appreciated that in the preferred configuration of the invention, the angle between the flux B(0) or B(1) and the easy axis of film 3 is approximately 90 degrees. The flux therefore lies substantially parallel to the so-called "hard" axis of magnetization in core 3 which is that axis perpendicular to the easy axis.

Turning now to FIGURE 2*b*, the mode of operation will be explained for interrogating the content of core 1. As before described, each binary cell in the search memory word register is interrogated as to the presence or absence of a particular binary bit 1 or 0, according to the particular word for which a search is conducted. In FIGURE 1, this is performed by producing a current flow in the drive line 7 in either one direction or the other according to the value of the requested binary bit. For example, if it is desired to ascertain whether or not the binary cell of FIGURE 1 contains a binary "1" in its memory core 1, then current flow in the direction of arrow 12 is produced in conductor 7 such that it generates an external magnetic field $H_I(1)$ as shown in the upper vector diagram of FIGURE 2*b*. Assuming now that the remanent magnetization in core 1 lies in direction 6 which produces field $H_M(1)$, it is seen from FIGURE 2*b* that interrogating field $H_I(1)$ has a direction in core 3 such that the total transverse field therein is the sum of $H_M(1)$ and $H_I(1)$. The absolute value of $H_I(1)$ is adjusted to be equal to that of $H_M(1)$, so that the total transverse field is twice that of $H_M(1)$. Therefore, the direction of magnetization in core 3 is maintained in the direction of the flux B(1) in the lower diagram of FIGURE 2*b*. If the field $H_M(1)$ by itself has sufficient magnitude to drive core 3 to saturation, then the application of a field having twice this magnitude will not increase the magnitude of flux B(1). For this reason, in the preferred embodiment, the magnitude of flux B(1) in FIGURE 2*b* is represented as being no greater than that of flux B(1) in FIGURE 2*a*. Because there is substantially no change of flux magnitude in a direction parallel to the core 3 easy axis under this first assumed condition, there will be no change in flux linking the sense line 9 which is essentially perpendicular to the easy axis in the preferred embodiment. Therefore, no voltage is induced in line 9 which thereby indicates that the cell contains a binary "1" bit.

In the event that field $H_M(0)$ exists at the time that field $H_I(1)$ is applied, thus indicating that core 1 contains a binary bit "0," it is seen from FIGURE 2*b* that the direction of $H_I(1)$ is directly opposite to the direction of field $H_M(0)$. If the absolute magnitude of $H_I(1)$ is equal to that of $H_M(0)$, then the vector addition of $H_I(1)$ and $H_M(0)$ in FIGURE 2*b* results in the cancellation of any transverse field effect in core 3. As noted previously, the magnetic core 3 used in this invention has the property such that its remanent magnetization has a stable state only in one of two opposite directions along the preferred magnetic axis. The cancellation of the dominant field $H_M$ in core 3 thereby causes the direction of magnetization B(0) to rotate and fall in one of two opposite directions along its preferred magnetic axis 8. The particular direction adopted by the remanent magnetization is governed by the direction of the small steering field $H_S$. Thus, as seen in the lower vector diagram in FIGURE 2*b*, the remanent magnetization B(R) in core 3 will fall along its easy axis in a direction indicated by the steering field $H_S$ in the upper diagram of FIGURE 2*b*. The presence of the steering field $H_S$ at the time when the transverse field is initially cancelled therefore prevents the magnetization B(R) from ever rotating to a direction along its preferred axis opposite to that shown in FIGURE 2*b*. Thus, when the transverse field is cancelled in core 3, the change of direction of the flux B(0) will always be in the same direction.

As before noted, the sense conductor 9 is so oriented in the preferred embodiment that a voltage is induced therein by any change of the flux in core 3 in a direction parallel to the preferred magnetic axis 8, such direction being perpendicular to the axis of line 9. Under the present assumption that the cell contains a binary "0" bit and is being interrogated for a binary "1," then a first signal of one polarity is induced in sense line 9 as the direction of magnetization changes from that of B(0) to that of B(R), which thus indicates that the cell does not contain the binary bit for which it is searched. Upon discontinuing the interrogation field $H_I(1)$, the effect of the remanent magnetization field $H_M(0)$ will again be felt in core 3 such that the direction of magnetization therein will revert to that indicated by the vector B(0). A second and subsequent output signal of polarity opposite to that of the first signal now appears on conductor 9. Either of these two signals may be used as the indication of noncomparison, and both are shown in FIGURE 3.

In the event that memory core 1 contains a binary "0" bit, then the application of interrogation field $H_I(0)$ in FIGURE 2*b* will result in a reinforcement of the transverse field $H_M(0)$ in core 3 such that the direction of magnetization in core 3 will not be changed. In this event, the flux maintains the direction as indicated by the vector labeled B(0) in FIGURE 2*b*, and no remanent magnetization B(R) falls along the preferred magnetic axis 8. However, assuming that core 1 contains the binary bit "1" when the cell is interrogated for binary "0," the application of the fields $H_M(1)$ and $H_I(0)$ in FIGURE 2*b* results in cancellation of the flux B(1) such that only remanent magnetization B(R) remains in core 3. Vector B(R) has a direction along the preferred magnetic axis 8 as steered by the longitudinal field $H_S$. In this event, the direction of magnetization in core 3 will have changed from that indicated by flux B(1) to the direction indicated by B(R). Because of the change in flux linking conductor 9, a first signal is induced therein at the commencement of the interrogating field $H_I(0)$. This signal has the same polarity as that signal induced when the change in flux direction is from B(0) to B(R). Upon discontinuing the interrogating field $H_I(0)$, the direction of flux in core 3 reverts to the direction indicated by flux vector B(1), and a second signal of opposite polarity will be induced in conductor 9. These two output signals are illustrated in FIGURE 3.

Figure 3:
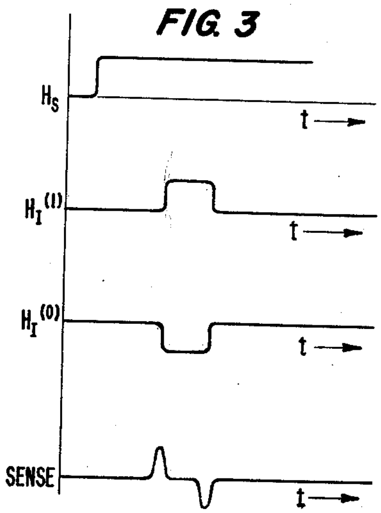
FIGURE 3 shows the polarity of the drive signals and output pulses.

FIGURE 3 shows the polarities of the possible interrogating fields $H_I(1)$ and $H_I(0)$, and steering field $H_S$, together with the polarity of the sense output signals which appear only in the event that the binary cell does not contain the binary bit for which it is sampled. It is further to be noted in FIGURE 3 that the interrogating field $H_I$ is only initiated at a time when the longitudinal steering field $H_S$ is present. This condition is necessary to insure that any change in the core 3 magnetization will always be toward the same direction along the easy axis, so that the respective polarities of the first and second sense signals will remain the same no matter what the binary content of core 1. However, the presence of field $H_S$ at the cancellation time of interrogating field $H_I$ is not required, because it has no effect upon the subsequent rotation of flux B(R) to the B(1) or B(0) direction ex cept as to possibly determine the speed at which the rotation occurs. Field $H_S$ may be a permanent bias provided either by a current carrying conductor as shown, or by other means. Conversely, it may be a pulsed field having a leading edge which, time-wise, is either prior to or at least coincident with the leading edge of the interrogating field $H_I$.

Figure 4:
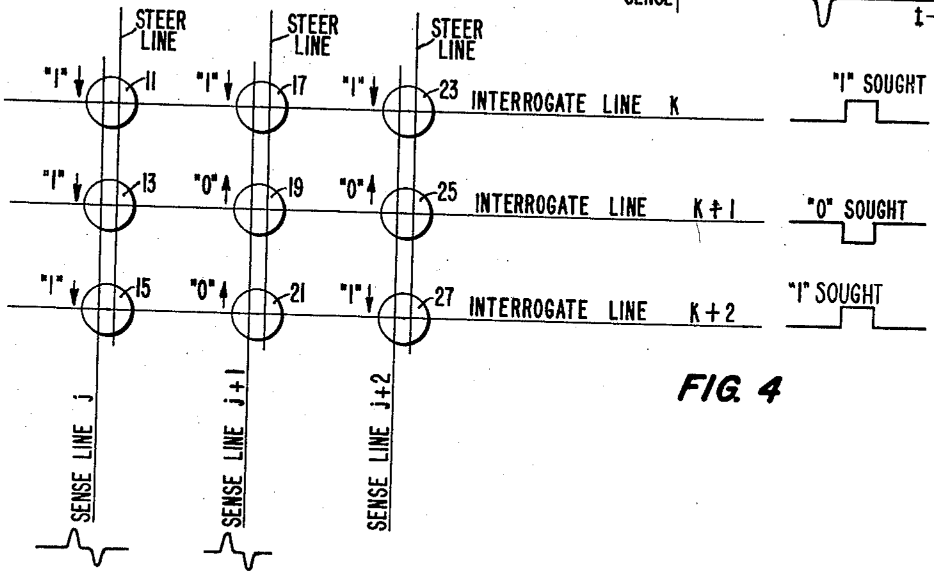
FIGURE 4 shows a memory of binary core cells which comprises the search memory of the present invention.

The presence of the longitudinal steering field $H_S$ is especially important when the invention is constructed according to the preferred embodiment in which the transverse field $H_M$ is perpendicular to the easy axis 8 of core 3. When flux B(1) or B(0) is essentially perpendicular to the core 3 easy axis before cancellation of field $H_M$, the magnetization of core 3, in the absence of a steering field $H_S$, may rotate with equal probability to either direction along the easy axis at the time that the field $H_I$ is applied. If B(R) has a direction opposite to the one shown in FIGURE 2*b*, then the polarities of the first and second output sense signals in FIGURE 3 would be reversed. Where a common sense line links two or more cells as shown in FIGURE 4, therefore, pulses which are generated at the same time but with opposite polarity, may cancel and thus create the false impression that no output pulses were generated by any of the cells on the common sense line. Hence, the use of the slight steering geld $H_S$ insures that the output signal polarity is the same for all cells associated with the same sense line. It should further be noted that the use of field $H_S$ also causes a higher rotational speed of the core 3 magnetization when $H_I$ is applied so that a higher signal voltage is induced on line 9.

FIGURE 4 shows but a small portion of a typical search memory array of the present invention having a plurality of binary cells arranged in columns and rows. Only one core of each cell is illustrated, however, each cell consists of a core pair as shown in FIGURE 1. For example, binary cells 11, 13, and 15 are arranged in column $j$ and comprise a portion of a word register $j$ in the search memory. In like fashion, core cells 17, 19, and 21 are in the column $j+1$, while cells 23, 25, and 27 comprise a portion of column $j+2$. It will be understood that the columns $j$, $j+1$, and $j+2$ may contain other cells not shown, depending upon the number of bits contained in each binary word stored. Within each column, each binary cell holds a binary bit of the associated word and thereby has a binary order significance. For example, cells 11, 17, and 23 which respectively form a portion of each of the word registers $j$, $j+1$, $j+2$, etc., all have the same binary order significance which may be represented by the symbol $k$. In like fashion, binary cells 13, 19, and 25 have the same binary order significance $k+1$, whereas cells 15, 21, and 27 have the same binary order significance $k+2$. It will further be realized that additional columns $j$ may be provided, depending upon the number of words to be held in the complete memory.

In order to simultaneously interrogate all of the word registers of the memory for the presence or absence of a particular word, interrogate lines $k$, $k+1$, $k+2$, etc. are associated with the correspondingly designated rows. These lines in FIGURE 4 are equivalent to interrogate line 7 in FIGURE 1. As before noted, the signal appearing on an interrogate line represents a binary bit of the word whose presence in the memory is sought. Also, each word register or $j$ column has associated therewith a sense line $j$, $j+1$, $j+2$, etc., which is inductively coupled with all of the binary cells in its associated column. As described in connection with FIGURE 1, whenever a binary cell does not contain the binary bit being sought in its particular binary order, a signal is generated on its associated sense line which indicates the noncomparison. Therefore, since each sense line in a column is associated with all of the binary cells of a particular word register, a noncomparison between one or more of the stored bits with the bits of the sought word results in an output signal on the associated sense line. This output signal on a sense line indicates that the word sought does not reside in the word register associated therewith.

The operation of the search memory in FIGURE 4 will be clarified in the following example. Assume that the binary cells in column $j$ contain all binary "1" bits in their memory cores as indicated by the arrows in FIGURE 4. Column $j+1$ has therein a binary configuration 100 as represented by the contents of cells 17, 19, and 21 respectively. Column $j+2$ contains binary configuration 101 as represented by the contents of cells 23, 25, and 27, respectively. Further assume that the word being sought has the binary configuration 101 as indicated by the signals respectively appearing on interrogation lines $k$, $k+1$, and $k+2$. In the $k$th row of the memory, a "1" signal is sought in all of the registers such that there is no cancellation of the transverse fields $H_M(1)$ in cells 11, 17, 23. Therefore, no signals appear on the associated sense lines $j$, $j+1$, and $j+2$ from the cells. In row $k+1$, a "0" binary bit is sought such that a signal is induced on sense line $j$ due to the noncomparison between the "1" bit contained in binary cell 13 and the sought bit "0" appearing on interrogate line $k+1$. No signals appear on sense lines $j+1$ and $j+2$ from cell 13 and the sought bit "0" appearing on interrogate line $k+1$. No signals appear on sense lines $j+1$ and $j+2$ from cells 19 and 25 because there is no cancellation of fields therein. In row $k+2$, a binary bit "1" is sought in all of the row cells, which causes the generation of a signal on sense line $j+1$ due to a noncomparison at binary cell 21. Therefore, sense lines $j$ and $j+1$ both have output signals appearing thereon, while sense line $j+2$ remains dormant, inasmuch as the binary bit configuration 101 held by cells 23, 25, and 27, respectively, compare in all respects to the sought binary bits 101 appearing on interrogate lines $k$, $k+1$, and $k+2$. Means may be provided which are responsive to the absence of a sense line output during interrogation time, so that the data processing apparatus or the like can determine in which word register the desired word is located.

It is also noted in connection with FIGURE 4 that each of the columns may have associated therewith a steer line for applying the steering field $H_S$. However, these individual steer lines might well be connected together and wound through the binary cells in each column so that the steering fields generated at all the cells in the memory have the same polarity.

Because difficulties of fabrication may make impractical the preferred embodiment of the search memory, it is not necessary to the operability of this invention that the magnetic fields $H_M$, $H_I$, and $H_S$ be applied in exactly the perpendicular relationship shown in FIGURES 2*a* and 2*b*. For example, the fields $H_M$ and $H_I$ conceivably may make a small angle with the hard axis of core 3, with field $H_S$ making a small angle with the easy axis. In such case, these fields can be resolved into components exactly parallel with the easy axis and with the hard axis of core 3. The sum of the components parallel with the easy axis act in the manner of field $H_S$. However, the preferred embodiment of the invention for obtaining the shortest operating time and the maximum signal output on sense line 9, is that in which a right angle relationship is maintained between the fields $H_M$, $H_I$, and $H_S$, with these fields being respectively orientated in parallel relationship with the hard and easy axes of the core 3. The advantage of this embodiment is that any change of magnetization direction in core 3 need not be greater than 90 degrees no matter what the binary content of core 1. It is also possible to have the magnitude of interrogate field $H_I$ unequal to that of memory field $H_M$. In the event that the absolute value of $H_I$ is slightly greater than that of $H_M$, the magnetization in core 3, when these two fields are opposite in direction, will rotate past the easy axis. However, any effect upon the output signal in the sense line will be negligible. In the event that the interrogate field $H_I$ is less in absolute magnitude than that of the field $H_M$, then a full 90 degree rotation of magnetization in core 3 will not be accomplished, although it will still be sufficient to generate a usable output signal.

Furthermore, it does not appear to be absolutely necessary to the operation of the invention that the $H_M$ field necessarily saturate the magnetic core in the absence of field $H_I$. This condition is desirable, however, inasmuch as the reinforcement of field $H_M$ by field $H_I$ would not thereby result in any substantial change in the direction or magnitude of magnetization in core 3. This may be important if these fields, or if the sense line 9, are not exactly orientated at a 90 degree angle to the easy axis, since any change in core 3 flux linking line 9 results in a signal being induced therein.

While a preferred embodiment of the invention has been shown and described, many modifications and alterations thereto will be apparent to one skilled in the art without departing from the spirit of the invention as defined in the appended claims.

I claim:

1. In a magnetic memory matrix of the kind that can be searched rapidly for the presence or absence of a particular word, a combination comprising a plurality of first magnetic cores arranged in a column so as to constitute a word register in said memory, each of said first cores being of the type having a preferred axis of magnetization along which remanent magnetization lies in either one or the other of two opposite directions, a plurality of second magnetic cores inductively coupled one with each of said first cores, each of said second cores being of the type having a preferred axis of magnetization along which remanent magnetization lies in either one or the other of two opposite directions, and being oriented to have its said preferred axis at an angle with the preferred axis of its associated first core, with said remanent magnetization of each of said first cores producing a first magnetic field of such magnitude as to magnetize its associated second core in substantially the same direction as that of said first field, each of said second cores having a first means inductively coupled therewith for producing a second magnetic field having a direction approximately parallel to the preferred axis of said second core and a magnitude small relative to said first magnetic field but large enough to insure that remanent magnetization in said second core lies in the direction of said second field upon substantial cancellation of said first magnetic field, each of said second cores further having a second means inductively coupled therewith, and whose operation is initiated only during the existence of said second field, for producing a third magnetic field with a magnitude substantially equal to that of said first field and having selectively either the same approximate direction as, or an opposed direction to, that of said first field for respectively reinforcing or cancelling the effect of said first field on the magnetization of said second core, and third means common to each of said second cores and inductively coupled therewith, for sensing a change in the magnetization of any one of said second cores in a direction parallel to its preferred axis of magnetization.

2. A combination according to claim 1 in which each of said first and second cores is of the thin film ferromagnetic uniaxial anisotropy type.

3. A combination according to claim 1 in which each of said first cores has a higher coercivity than that of each of said second cores.

4. A combination according to claim 3 in which each of said first and second cores is of the thin film ferromagnetic uniaxial anisotropy type.

5. A combination according to claim 1 in which the magnetization of each of said second cores is biased to saturation by its associated first field.

6. A combination according to claim 1 in which said angle of orientation is 90 degrees.

7. A combination according to claim 6 in which the first means of each said second cores is a common means.

8. A combination according to claim 6 in which said first means comprises a first electrical conductor oriented with its axis approximately perpendicular with the said second core preferred axis and having current flow therein in only one direction, said second means comprises a second electrical conductor oriented with its axis approximately perpendicular with the said first core preferred axis and selectively having current flow therein in one direction or the other only when current is flowing in said first conductor, and said third means comprises a third electrical conductor orientated with its axis approximately perpendicular to the said second core preferred axis for sensing any change in the second core magnetic flux linkages therewith.

9. A combination according to claim 8 in which each of said first and second cores is of the thin film ferromagnetic uniaxial anisotropy type, with each of said first cores having a higher coercivity than that of said second cores.

10. In a magnetic memory matrix of the kind that can be searched rapidly for the presence or absence of a particular word, a combination comprising a plurality of first magnetic cores arranged in columns and rows with each of said columns constituting a word register in said memory, each of said first cores being of the type having a preferred axis of magnetization along which remanent magnetization lies in either one or the other of two opposite directions, a plurality of second magnetic cores inductively coupled one with each of said first cores, each of said second cores being of the type having a preferred axis of magnetization along which remanent magnetization lies in either one or the other of two opposite directions and being oriented to have its said preferred axis of magnetization at an angle with the preferred axis of its associated first core, with the said remanent magnetization of each of said first cores producing a first magnetic field of such magnitude as to magnetize its associated second core in substantially the same direction as that of said first field, each of said second cores having a first means inductively coupled therewith for producing a second magnetic field having a direction approximately parallel to the preferred axis of said second core and a magnitude small relative to said first magnetic field but large enough to insure that remanent magnetization in said second core lies in the direction of said second field upon substantial cancellation of said first magnetic field, second means individual to each of said rows and common to each of said second cores therein and inductively coupled therewith, and whose operation is initiated only during the existence of said second field, for producing a third magnetic field at each of its associated cores with magnitude substantially equal to that of said associated first field and having selectively either the same approximate direction as, or an opposed direction to, that of said associated first field, for respective reinforcing or cancelling the effect of said first field on the magnetization of its associated second core, and third means individual to each of said columns and common to each of said second cores therein, and inductively coupled therewith, for sensing a change in the magnetization of one of said second cores in a direction parallel to its preferred axes of magnetization.

11. A combination according to claim 10 in which each of said first and second cores is of the thin film ferromagnetic uniaxial anisotropy type.

12. A combination according to claim 10 in which each of said first cores has a higher coercivity than that of said second cores.

13. A combination according to claim 12 in which each of said first and second cores is of the thin film ferro-magnetic uniaxial anisotropy.

14. A combination according to claim 10 in which the magnetization of each of said second cores is biased to saturation by each of said associated first fields.

15. A combination according to claim 10 in which said angle of orientation is 90 degrees.

16. A combination according to claim 15 in which each of said first means comprises a first electrical conductor oriented with its axis approximately perpendicular with its said associated second core preferred axis and having current flow therein in only one direction, said second means comprises a second electrical conductor oriented with its axis approximately perpendicular with the said first core preferred axis and selectively having current flow therein in one direction or the other only when current is flowing in said first conductor, and said third means comprises a third electrical conductor oriented with its axis approximately perpendicular to the said second core preferred axis for sensing any change in the second core magnetic flux linkages therewith.

17. A combination according to claim 16 in which each of said first and second cores is of the thin film ferromagnetic uniaxial anisotropy type, with each of said first cores having a higher coercivity than that of said second cores.

18. In a magnetic search memory, the combination comprising a first plurality of ferro-magnetic uniaxial anisotropy thin film memory cores, a second plurality of ferro-magnetic uniaxial anisotropy thin film read-out cores each inductively coupled one with each of said memory cores and physically oriented therewith so that the axes of preferred magnetization are substantially perpendicular, where each said read-out core has a coercivity such that it is biased substantially to saturation by and in the direction of the field generated by remanent magnetization in its associated memory core, first winding means individual to each said read-out core for selectively applying a magnetic interrogating field thereto in a direction to either reinforce or substantially cancel said memory core remanent magnetization field, second winding means for applying a magnetic steering field, at least by the time of said interrogating field application, to each said read-out core in a fixed predetermined direction along its preferred axis, said steering field having a magnitude which is small relative to said memory core remanent magnetization field but large enough to insure that remanent magnetization in said read-out core reverts to said fixed predetermined direction upon substantial cancellation of said last mentioned field, and sense winding means common to and inductively coupled with all of said read-out cores such that voltages induced therein by changes in read-out core preferred axis magnetization are additive.

19. A combination according to claim 18 wherein said interrogating fields are simultaneously applied to all of said read-out cores.

20. In a magnetic search memory, the combination comprising a first plurality of ferro-magnetic uniaxial anisotropy thin film memory cores arranged in columns and rows, with each said column constituting a word register, a second plurality of ferro-magnetic uniaxial anisotropy thin film read-out cores each inductively coupled one with each of said memory cores and physically oriented therewith so that the axes of preferred magnetization are substantially perpendicular, where each said read-out core has a coercivity such that it is biased substantially to saturation by and in the direction of the field generated by remanent magnetization in its associated memory core, first winding means individual to each of said rows for selectively applying a magnetic interrogating field to each said read-out core therein in a direction to either reinforce or substantially cancel said memory core remanent magnetization field, second winding means for applying a magnetic steering field, at least by the time of said interrogating field application, to each said read-out core in a fixed predetermined direction along its preferred axis, said steering field having a magnitude which is small relative to said memory core remanent magnetization field but large enough to insure that remanent magnetization in said read-out core reverts to said fixed predetermined direction upon substantial cancellation of said last mentioned field, and sense winding means individual to each of said columns and inductively coupled with each said read-out core therein such that voltages induced in said sense winding by changes in read-out core preferred axis magnetization are additive.

21. A combination according to claim 20 wherein said interrogating fields are simultaneously applied to all of said read-out cores in every row.

References Cited by the Examiner

UNITED STATES PATENTS

| | | | |
|---|---|---|---|
| 2,984,825 | 5/61 | Fuller et al. ____________ | 340—174 |

FOREIGN PATENTS

| | | |
|---|---|---|
| 845,605 | 8/60 | Great Britain. |
| 854,153 | 11/60 | Great Britain. |

OTHER REFERENCES

Pages 54S, 55S, April 1959, "Coincident-Current Nondestructive Readout From Thin Films," by Oakland and Rossing, Journal of Applied Phys., supplement to vol. 30, No. 4.

IRVING L. SRAGOW, *Primary Examiner.*

JOHN T. BURNS, *Examiner.*

UNITED STATES PATENT OFFICE

CERTIFICATE OF CORRECTION

Patent No. 3,179,928 April 20, 1965

Robert E. Sorensen

It is hereby certified that error appears in the above numbered patent requiring correction and that the said Letters Patent should read as corrected below.

Column 3, line 59, for "trasverse" read -- transverse --; column 6, line 33, for "of the possible" read -- of the two possible --; column 10, line 34, for "of one of" read -- of any one of --.

Signed and sealed this 14th day of September 1965.

(SEAL)
Attest:

ERNEST W. SWIDER
Attesting Officer

EDWARD J. BRENNER
Commissioner of Patents